(12) United States Patent
Ling et al.

(10) Patent No.: US 7,295,564 B2
(45) Date of Patent: Nov. 13, 2007

(54) VIRTUAL OUTPUT QUEUE (VOQ) MANAGEMENT METHOD AND APPARATUS

(75) Inventors: Jing Ling, Fremont, CA (US); Juan-Carlos Calderon, Fremont, CA (US); Jean-Michel Caia, San Francisco, CA (US); Anguo T. Huang, Mountain View, CA (US); Vivek Joshi, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1100 days.

(21) Appl. No.: 10/337,615

(22) Filed: Jan. 6, 2003

(65) Prior Publication Data

US 2004/0131069 A1    Jul. 8, 2004

(51) Int. Cl.
*H04L 12/54* (2006.01)
(52) U.S. Cl. ..................................... 370/412
(58) Field of Classification Search ................ 370/229, 370/235, 351, 389, 394, 412–416, 419; 709/230, 709/232; 710/56
See application file for complete search history.

(56) References Cited

U.S. PATENT DOCUMENTS

| | | | |
|---|---|---|---|
| 6,088,734 A * | 7/2000 | Marin et al. ................ 709/232 |
| 6,088,745 A * | 7/2000 | Bertagna et al. ............... 710/56 |
| 6,169,748 B1 * | 1/2001 | Barbas et al. ................ 370/468 |
| 6,574,231 B1 * | 6/2003 | Leung ......................... 370/412 |
| 6,754,744 B2 * | 6/2004 | Kim et al. ..................... 710/56 |
| 6,892,284 B2 | 5/2005 | Ling et al. |
| 6,944,728 B2 | 9/2005 | Calderon et al. |
| 7,061,867 B2 | 6/2006 | Huang et al. |
| 7,154,853 B2 | 12/2006 | Caia et al. |
| 2003/0091041 A1 | 5/2003 | Caia |
| 2003/0223442 A1 | 12/2003 | Huang et al. |
| 2003/0225991 A1 | 12/2003 | Calderon et al. |

\* cited by examiner

*Primary Examiner*—Dmitry Levitan
(74) *Attorney, Agent, or Firm*—Blakely, Sokoloff, Taylor & Zafman LLP

(57) ABSTRACT

A method and apparatus for providing a virtual output queue (VoQ) from a received set of data packets in a multi-service system. Each packet is divided into at least one partition, including a last partition that includes packet information, such as error status and packet length. The system receives the packet from a flow, parses the packet into partitions, including a first partition and the last partition, places each last partition into a linked list based on a time when the last partition was received, links the last partition to the first partition, and employs the linked list as the output queue. This system allows for rapid compilation and transmission of different sized packets, and obviates the need for the receiving processor to wait for the last partition to discard a bad packet.

18 Claims, 4 Drawing Sheets

VIRTUAL OUTPUT QUEUE (VOQ) MANAGEMENT METHOD AND APPARATUS

BACKGROUND OF THE INVENTION

1. Field of the Invention

The present invention relates generally to the field of high speed data transfer, and more specifically to methods and apparatus for efficiently implementing VoQs for different classes of service in a high speed IP router environment.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner. Certain protocols or standards may be employed in transferring data from one point to another, and such standards enable hardware and software using different configurations to effectively receive and transfer the data. Such standards include, but are not limited to, standards promulgated by the ITU (International Telecommunications Union) and ANSI (American National Standards Institute).

The points through the data network operate to receive data frames or packets from various requesters and provide results or satisfy requests in an orderly and efficient manner. Frames or packets including requests for access to resources may arrive synchronously or asynchronously. Requests may be for access to multiple resources or channels or to particular sets of resources or channels.

FIG. 1 illustrates one challenge inherent in such a system. One transfer point in the network, such as a router, may receive packets such as packet 101 from multiple queues, such as queue 102. Queues may receive packets over multiple channels, such as channel 103. All packets received from the queues over the various channels are provided from the router in an ordered manner, such as via an output list. The desired output list provided is a single common output list 105, such as a VoQ. VoQs collect the queue information for all channels and transmit the output list information across the common output port.

In different applications, different incoming requests may be accorded different classes of service, some classes having higher priority than others. The data received may take different forms, including different packet sizes and related parameters. Packets may arrive from multiple queues, each packet having a specific class of service.

The problem with such a multiple class of service VoQ arrangement is that simply queuing the incoming requests in a FIFO (first in, first out) manner can result in inefficiencies, the most notable inefficiency being timing required to assess the quality of the packet, assemble the queue, and prepare the data for transfer. Such a process can require multiple seeks to memory, as received packets may be stored in memory, or enqueued, read from memory, or dequeued, and then transmitted.

Previous systems have employed a FIFO design which queues the packet upon receipt of the first bytes of a packet. This type of system can encounter delays if the packet is incomplete or interrupted. Such an imperfect packet must either be repaired or discarded, and either action decreases throughput and system performance. Alternately, systems have employed FIFO logic based on the timing of the last bits of the packet received. In many circumstances, this too can result in inefficiencies; for example, in the case of a damaged packet, packet length and error information is not available until the end of the packet. These inefficiencies, among others, result in an excessive number of memory accesses to manage the different VoQs, which is undesirable.

With the current state of internet traffic, and in view of the significant latency associated with enqueueing, dequeueing, and transmitting output queues on currently available memory devices, it would be desirable to provide a system and method that would improve the maximum attainable transmission rate of network processors, traffic managers, or other devices employing VoQs or other queuing arrangements over those systems and methods previously offered.

DESCRIPTION OF THE DRAWINGS

The present invention is illustrated by way of example, and not by way of limitation, in the figures of the accompanying drawings in which.

DETAILED DESCRIPTION OF THE INVENTION

The present design implements VoQs for multiple classes of service including requisite enqueueing and dequeueing algorithms, and provides the external memory structure for implementing VoQs. The present design may be employed in packet enqueueing and dequeueing applications where arrival time of the last byte of the received packets determines the transmission order of packets in the associated VoQ. Further, certain information that can only be generated upon receipt of the last byte of a packet, such as packet length or reception error information, can be prepended to the packet when dequeued from memory. Prepending of packet information enables either transmission or discarding of the packet earlier than previously available. The prepended information may be stored in data memory, either on-chip or remotely, in addition to the contents of the packet.

The system may be any multi-service access engine, including but not limited to a multi-service broadband access engine for ATM, IP, and Ethernet transmission over SONET/SDH streams operating at a rate between approximately 622 Mbps and 2.4 Gbps. The system provides full duplex traffic management and handles simultaneous flows of cells and/or packets in accordance with the functionality described herein. The design may also be implemented in other Layer 2 or Layer 3 products. The present design links packets belonging to the same VoQ by their last partition. The number of accesses is typically identical to the number of partitions enqueued.

Figure 1:
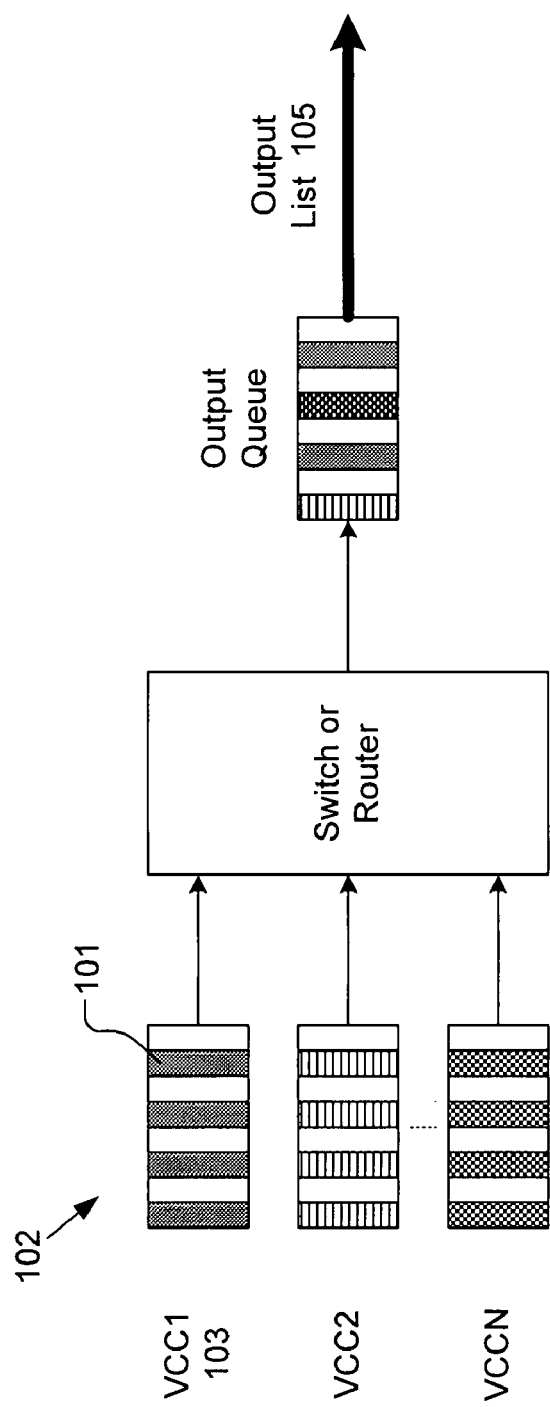
FIG. 1 illustrates combining flows and building a VoQ and output list.

The basic concept of enqueuing and building a VoQ is illustrated in FIG. 1. As shown in FIG. 1, multiple requesters may transmit packets to the hardware apparatus, such as a network switch or router, and the hardware apparatus builds a VoQ for all received packets for each class of service. Packets are decoded and are linked or associated with a queue only upon receipt of the last partition. For each queue, also known in this implementation as a flow, or virtual connection (VCC), the apparatus forms a VoQ linked list of packets received. Upon receipt of a partition of a packet that is not the last partition of the packet, the system links the partition to the existing link list of the corresponding flow. When the last partition of a packet is received, this packet is linked to the previous packet in the corresponding VoQ.

Figure 2:
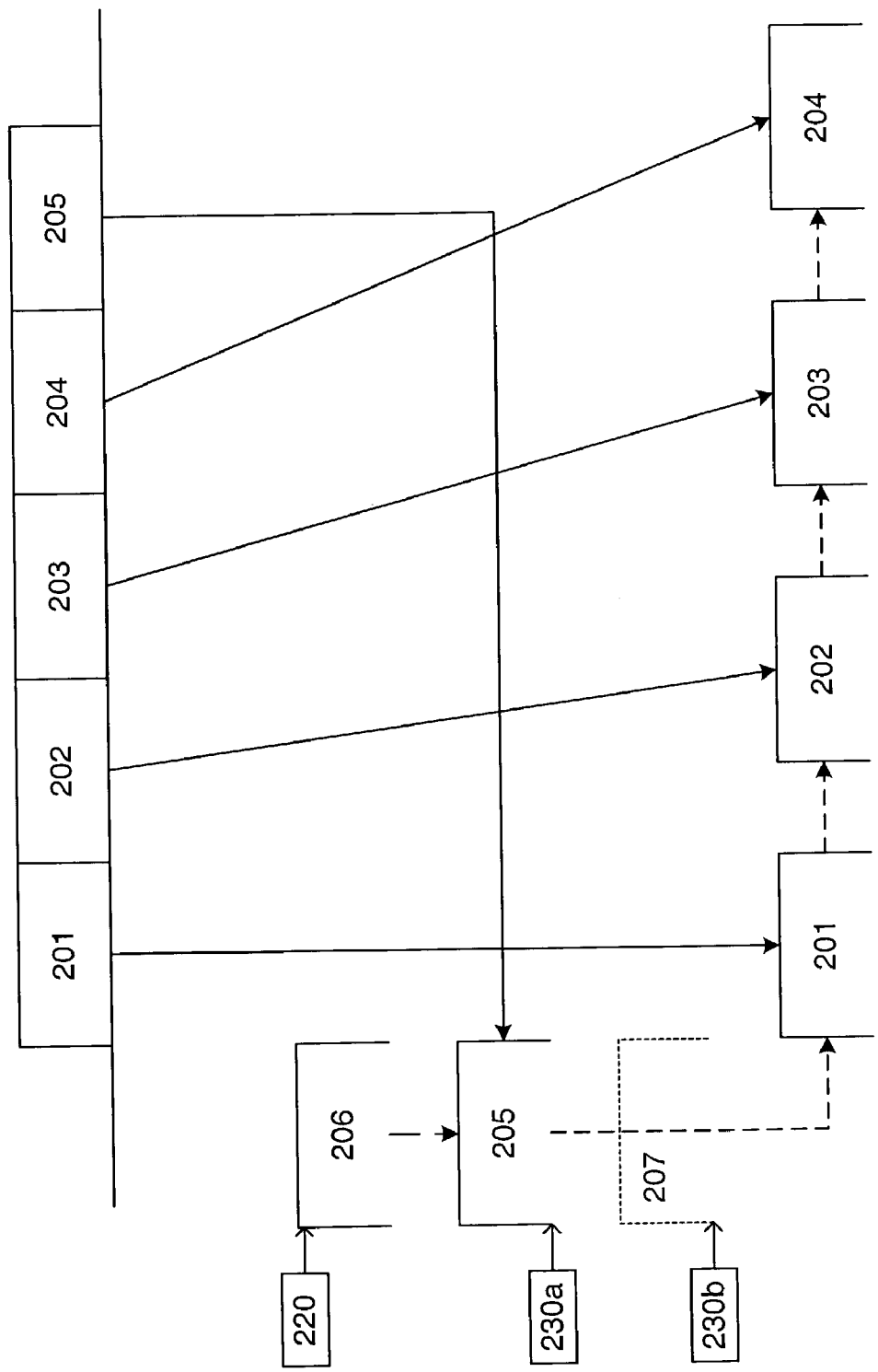
FIG. 2 presents a basic data structure for storage of packet partitions according to the present design.

FIG. 2 illustrates storage of packet partitions for a single flow according to the foregoing design. From FIG. 2, Partition 1 201 is received first, followed by partitions 2, 3, 4, and 5 202, 203, 204, and 205. Partition 5 includes information that it is the last partition in the packet. Each partition is stored when received but partitions are only linked once Partition 5 205 is received. The five partitions are linked in order of Partition 5 205, then Partition 1 201, Partition 2 202, Partition 3 203, and Partition 4 204. These are then linked to previous packet 206 by linking Partition 5 205 to previous packet 206. FIG. 2 represents receiving, partitioning, and ordering for a single class of service.

The system maintains specific information in the form of pointers associated with the partitions and packets. The information is used for enqueueing or dequeueing each VoQ. The information may be maintained in an on-chip memory, but any readily available storage mechanism known to those skilled in the art may be employed. A Head Pointer points to the memory partition containing the last partition of the packet at the beginning of one VoQ. In FIG. 2, for a two partition VoQ linked list, the Head Pointer 220 points to the last partition of previous packet 206. A Tail Pointer points to the location of a free memory partition used to store the last partition of the next packet belonging to the particular VoQ. In FIG. 2, first Tail Pointer 230*a* originally points to the free location where Partition 5 205 is eventually positioned, and then this first Tail Pointer 230*a* moves to free location 207 as shown by Tail Pointer 230*b*. The Current Pointer (not shown) points to the location of the next partition to be transmitted. The Current Pointer in the scenario of FIG. 2 would point to a next partition to be transmitted. In the event the previous packet 206 had been transmitted, the Current Pointer would point to Partition 5 205.

The system further builds a linked list or set of linked lists in data memory. Control fields may be employed in each partition of a packet to enable and facilitate linking. In all packet memory partitions except the last memory partition of a packet, certain control fields may be employed. A Next Partition Pointer points to the next partition after the current partition. Thus, in FIG. 2, a Next Partition Pointer in Partition 3 203 would point to Partition 4 204. Current Flow Number provides the flow number or VCC number for the current packet. This number may be employed in multiple locations or in the first partition of the packet. Thus in FIG. 2 Partition 5 205 may include a Current Flow Number, such as Current Flow Number 5, indicating the flow from where the packet and partitions originated. EOP, or End of Partition, is a binary indication as to whether the partition is the last partition of a packet. From FIG. 2, only Partition 4 204 of the five packets transmitted includes a "true" EOP indication. SOP or Start of Packet, indicates whether the partition is a start of a packet or a continuation of a packet. The SOP for Partition 1 201 of FIG. 2 would indicate start of a packet, while the SOP for partitions 202-204 would indicate a continuation of a packet. The SOP can thus be binary.

For the last partition of a packet, Partition 5 205 in FIG. 2, other control fields may be provided. Control fields for the penultimate partition of a packet may include Next Partition Pointer, a pointer to the first partition of the packet. For FIG. 2, the Next Partition Pointer would indicate Partition 1 201. In a situation where the packet only contains one partition, the field may be used to store the flow number or VCC. The Last Partition Pointer points to the last memory partition of the next packet in the particular VoQ. Thus in FIG. 2, previous packet 206 points the Last Partition Pointer to the last memory partition of the next packet, namely Partition 5 205. Packet Length indicates the length of the packet, packet status indicates the presence of typically encountered errors, including but not limited to reassembly errors and UTOPIA underflow or overflow indications. EOP and SOP may also be included in the last partition of a packet as described above in connection with the preceding packets.

Varying quantities of control field bits for a partition may be employed, and one implementation can be 64 bits. Control fields may include the aforementioned fields as well as fields such as packet length. Packet length can be encoded by including a number of partitions instead of quantity of bytes along with a bit indicating whether the last partition is full. If the last partition is full, it is equal size with the preceding partitions. If, however, the last partition is not full, the last byte of the partition may be used to store the number of bytes in the last partition. Three fields, namely packet length, last partition full, and last partition length, enable computation of packet length in bytes. For a one partition packet, the first and last partition uses the Next Partition Pointer control field to store the flow number or VCC number corresponding to the packet.

Figure 3:
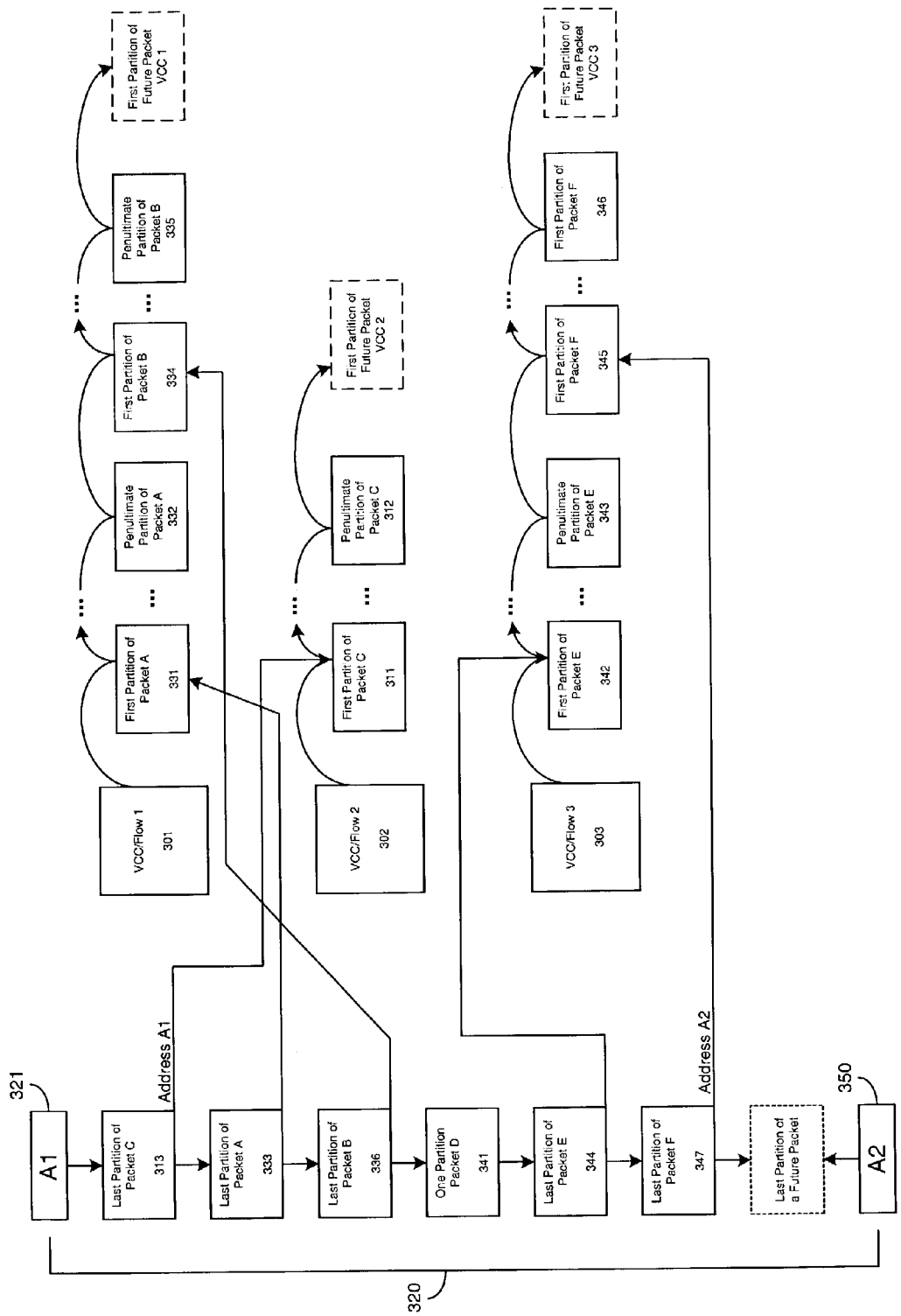
FIG. 3 is the data structure of the multi-service VoQ according to the present design.

One example of the design for multiple VoQs is presented in FIG. 3. FIG. 3 shows the data structure used by one VoQ with three VCC/Flows associated therewith. Other VoQs, not shown FIG. 3, may employ identical data structures depending on the circumstances presented. Three flows are shown in FIG. 3, namely VCC/Flow 1 301, VCC/Flow 2 302, and VCC/Flow 3 303. The first complete packet received (in time) is Packet C, received from Flow 2 302. First Partition of Packet C 311 is received and decoded, followed by Penultimate Partition of Packet C 312. The intermediate partitions received between First Partition of Packet C 311 and Penultimate Partition of Packet C 312, represented by the dotted lines in each set of partitions in FIG. 3, are also received and decoded. In the event that Packet C or any other packet is corrupted, determined by reception and decoding including review of the Last Partition of the packet, the system discards the corrupted packet and no further processing of that packet, such as placing it in a linked list, takes place. In this implementation, the Last Partition of Packet C 313, containing the information such as packet length, reception error information, and/or other control information, is captured and associated with Head Pointer 321 in VoQ linked list 320. This Head Pointer 321 is given an address, such as A1, and the Head Pointer 321 is associated with the last partitions of packets received from the various flows. The Last Partition of Packet C 313 in the VoQ linked list 320 is associated or linked with First Partition of Packet C 311 for location and transmission.

As used herein, three elements of a packet include the First Partition, the Penultimate Partition, and the Last Partition. First and Penultimate Partitions contain data and the control fields discussed above, while the Last Partition includes the reference information, is placed in the VoQ linked list 320, and is associated with the First Partition from the VoQ linked list 320. Other terminology may be employed when referring to these partitions or subgroupings of the packet. Two linked lists are thus formed, a VoQ linked list 320 and a VCC/Flow linked list linking the non-last partitions received from each flow.

The next packet received in time is Packet A received from Flow 1 301. The First Partition of Packet A 331 is received, followed by Penultimate Partition of Packet A 332. The Last Partition of Packet A 333 is captured and associated with Last Partition of Packet C 313 in VoQ linked list 320, and is associated or linked with First Partition of Packet A 331 for location and transmission. The next packet received is Packet B, also received from Flow 1 301. The First Partition of Packet B 334 is received, followed by Penultimate Partition of Packet B 335. The Last Partition of Packet B 336 is captured and associated with Last Partition of Packet A 333 in VoQ linked list 320, and is associated or linked with First Partition of Packet B 334 for location and transmission.

The next packet received is a single partition Packet D 341, received from Flow 3 303. As a single packet, it is simply placed in the VoQ linked list 320 in its entirety with an association with the Last Partition of Packet B 336. No association from the VoQ linked list 320 is provided, and Packet D is not linked to the VCC/Flow linked list.

The next packet received in time is Packet E received from Flow 3 303. The First Partition of Packet E 342 is received, followed by Penultimate Partition of Packet E 343. The Last Partition of Packet E 344 is captured and associated with Penultimate Partition of Packet D 341 in linked list 320, and is also associated or linked with First Partition of Packet E 342 for location and transmission. The next packet received is Packet F, also received from Flow 3 303. The First Partition of Packet F 345 is received, followed by Penultimate Partition of Packet F 346. The Last Partition of Packet F 347 is captured and associated with Last Partition of Packet E 344 in VoQ linked list 320, and is associated or linked with First Partition of Packet F 345 for location and transmission.

Tail pointer 350 points to the tail of the linked list. The packets are linked as shown in the linked list 320 of FIG. 3, namely in the order Packet C, Packet A, Packet B, Packet D, Packet E, and Packet F. Additional packets received are tagged and linked to VoQ linked list 320, and the packets are transmitted in this order.

Figure 4:
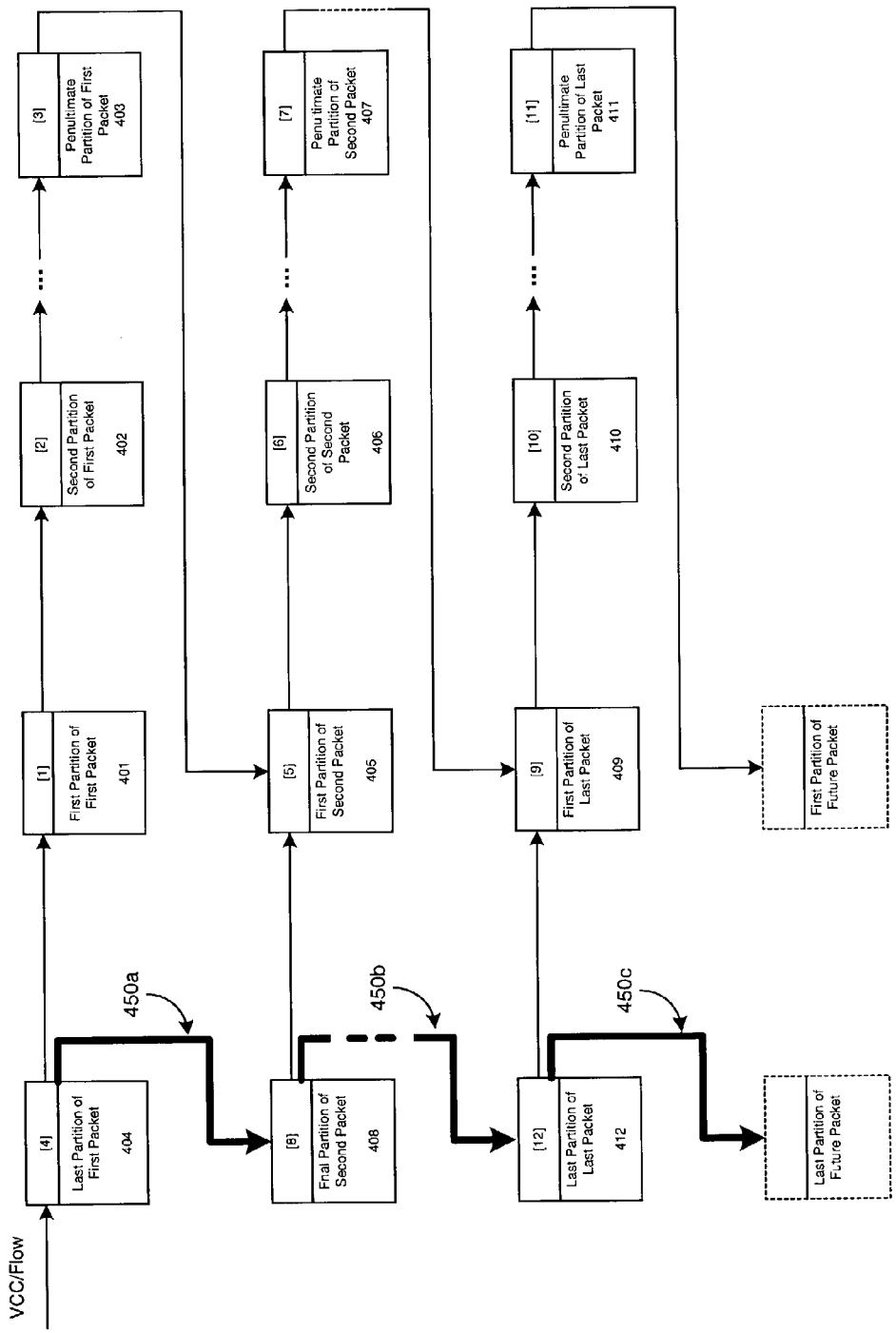
FIG. 4 a single flow VOQ data structure.

In a situation where each flow is assigned its own VoQ, the data structure of FIG. 4 may be employed. FIG. 4 is conceptually similar to FIG. 2, but provides more detail regarding the particular data structure aspects. The numbers included in brackets within the elements of FIG. 4 represent the order of arrival of the partition.

From FIG. 4, First Partition of First Packet 401 arrives first, followed by Second Partition of First Packet 402, then other partitions, and then Penultimate Partition of First Packet 403, followed by Last Partition of First Packet 404. The next packet is received in similar fashion, namely First Partition of Second Packet 411 arrives first, followed by Second Partition of Second Packet 412, then other partitions, and then Penultimate Partition of Second Packet 413, followed by Last Partition of Second Packet 414. The third packet is received in similar fashion, namely First Partition of Third Packet 421 arrives first, followed by Second Partition of Third Packet 422, then other partitions, and then Penultimate Partition of Third Packet 423, followed by Last Partition of Third Packet 424. Additional packets are received in a similar manner. The link list is shown via darkened lines 450a, 450b, and 450c, linking the last partitions of the first packet, the second packet, the third packet, and so on.

In both FIGS. 3 and 4, the last partition of each packet points to two different partitions, namely the first partition of the same packet and the last partition of the next packet. Using this data structure, the system can transmit the packets and they can be received and dequeued such that packets may be read in the order last partition, first partition, second partition, all other intermediate partitions, and then the penultimate partition. The dequeue processor can initially access the packet information, including but not limited to error status and packet length, and decide whether to discard the packet, forward the packet, and optionally pre append the packet with its status, namely incomplete, failed CRC, or other appropriate status. Such an implementation avoids requiring a second access to the first partition of the packet to store packet information for decoding upon initial receipt by the dequeue processor. With the last portion of the packet dequeued first, the processor can store the partition on chip until dequeueing of the penultimate partition.

A partition may be added or received from a VoQ as follows. When the partition is not the last part of the packet, the system writes the partition into data memory using a reserved future partition address for the corresponding VCC/Flow. If the partition is the first partition of the packet, the corresponding VCC/Flow number may be written into the memory partition. The system then updates the control fields in the memory partition. When the partition is the last partition of a packet, including any single partition packets, the system can write the partition into data memory using the reserved future last partition address as indicated by the tail pointer for the corresponding VoQ. The system allocates a new free partition, updates the tail pointer, and updates the control fields in the memory partition. In the event the corresponding VoQ has no packet, the system updates the head pointer to reflect the absence of the packet.

For transmitting or removing a partition, the system initially reads the memory partition indicated by the Current Pointer. Three different situations may exist. If the partition is the same as the one indicated by the Head Pointer, and the partition is not a one partition packet, the partition is the Last Partition of the packet. The system then stores this partition, transmits the last partition of the previous packet, stores the address of the next last partition as the Head Pointer, and stores the address of the first partition of the packet as the Current Pointer. If the situation is such that the partition is the Penultimate partition, found by comparing the number of partitions that have been read and the packet length, the system stores the address in the Head Pointer as the Current Pointer and transmits the partition. In the third situation, namely any other scenario, the system stores the address of the next partition as the Current Pointer and transmits the partition. Finally, in all three situations, the system frees the transmitted memory partition.

The present system may be implemented using hardware, software, or firmware having the capability to function as described herein. One implementation is a processor having available queuing, parsing, and assembly capability, data memory, and possibly on chip storage, but other hardware, software, and/or firmware may be employed.

It will be appreciated to those of skill in the art that the present design may be applied to other systems that perform enqueueing and/or dequeueing, or that build output queues, and is not restricted to the enqueue/dequeue structures and processes described herein. Further, while specific queues, VCCs, Flows, requesters, packets, partitions, and control fields have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for assembling an output queue from a received set of packets, each packet having at least one partition, wherein a last partition comprises packet information, the method comprising:
   initially processing a packet to add the packet to the output queue, comprising:
     receiving all partitions for the packet;
     including the last partition of the packet in a linked list linked to another last partition of a previous packet already included within the linked list, wherein the last partition of each of the packets includes packet information comprising at least one of error status or packet length; and
     associating the last partition of the packet in the linked list with a first partition of the packet, if the packet has more than one partition; and
   processing subsequent packets according to the receiving, including, and associating of the initial processing to add the subsequent packets to the output queue.

2. The method of claim 1, wherein the packet length comprises total number of partitions for the packet, an indication whether the last partition is full, and a number of bytes in the last partition.

3. The method of claim 1, wherein said associating further comprises associating the first partition of the packet with any second partition of the packet.

4. The method of claim 1, wherein the received set of packets may be received from a plurality of flows.

5. The method of claim 1, wherein said associating further comprises:
   associating the last partition to a preceding last partition from a preceding packet when to preceding packet is available; and
   associating the last partition to a head pointer when the preceding last packet is unavailable.

6. The method of claim 1, wherein one remaining packet comprises one packet comprising a single partition, and wherein additionally processing the packet comprising the single partition comprises:
   receiving the partition from the packet comprising the single partition; and
   including the single partition in the linked list.

7. A method for assembling an output queue from a received set of packets, the method comprising:
   receiving the packets from at least a flow, wherein the packets are segmented into partitions including a first partition and a last partition;
   placing the last partition associated with each of the packets into a linked list that links the last partition of consecutive packets to each other, wherein the last partition of each of the packets includes packet information comprising at least one of error status or packet length;
   linking the last partition for each of the packets to the first partition for each corresponding one of the packets; and
   employing the linked list as the output queue.

8. The method of claim 7, wherein packet length comprises total number of partitions for a corresponding one of the packets, an indication whether the last partition is full, and a number of bytes in the last partition.

9. The method of claim 7, wherein the partitions comprise control fields dependent upon partition position within each of the packets.

10. The method of claim 7, wherein said linking the last partition for each of the packets further comprises:
    associating the last partition to a preceding last partition from a preceding packet from among the packets, if the preceding packet is still queued by the output queue; and
    associating the last partition to a head pointer of the output queue, if the preceding packet is no longer queued by the output queue.

11. The method of claim 10, further comprising associating the first partition for each of the packets with any second partition after said linking and prior to said employing.

12. The method of claim 7, wherein placing the last partition associated with each of the packets into a linked list that links the last partition of consecutive packets to each other comprises placing the last partition associated with each of the packets based on a time when the last partition for each of the packets was received.

13. A system for assembling an output queue from a received set of packets, comprising:
    a parsing and assembly device configured to receive each packet from at least one flow, wherein each packet is segmented into partitions including a first partition and a last partition; and
    a linking device configured to place each last partition for each packet into a linked list that links the last partition of consecutive packets to each other based on the time when the last partition for each packet was received and to link the last partition to the first partition for each packet, wherein the last partition of each of the packets includes packet information comprising at least one of error status or packet length.

14. The system of claim 13, wherein the packet length information comprises a total number of partitions for the packet, an indication whether the last partition is full, and a number of bytes in the last partition.

15. The system of claim 13, wherein the partitions comprise control fields dependent upon partition position within the packet.

16. The system of claim 15, wherein control fields in the last partition include a next partition pointer pointing to the first partition of the packet and a last partition painter pointing to a memory location of the last partition of a next packet if the next packet is available.

17. The system of claim 13, wherein said linking device is configured to associate the last partition to a preceding last partition from a preceding packet when the preceding packet is available and associate the last partition to a head pointer when the preceding last packet is unavailable.

18. The system of claim 13, wherein said linking device is further configured to associate the first partition with any second partition.

* * * * *

UNITED STATES PATENT AND TRADEMARK OFFICE
CERTIFICATE OF CORRECTION

PATENT NO. : 7,295,564 B2  
APPLICATION NO. : 10/337615  
DATED : November 13, 2007  
INVENTOR(S) : Ling et al.

Page 1 of 1

It is certified that error appears in the above-identified patent and that said Letters Patent is hereby corrected as shown below:

Column 7, at line 33, delete "to" and insert --the--.  
Column 8, at line 48, delete "painter" and insert --pointer--.

Signed and Sealed this

Twentieth Day of May, 2008

JON W. DUDAS  
*Director of the United States Patent and Trademark Office*